United States Patent [19]

Swan

[11] 4,280,426
[45] Jul. 28, 1981

[54] METHOD OF MANUFACTURING WHEEL DISCS

[75] Inventor: Larry G. Swan, Fairport, N.Y.

[73] Assignee: Motor Wheel Corporation, Lansing, Mich.

[21] Appl. No.: 15,449

[22] Filed: Feb. 26, 1979

[51] Int. Cl.³ .............................................. B21D 53/26
[52] U.S. Cl. ............................. 113/116 D; 29/159.01; 29/417; 428/579; 83/32; 113/116 BB
[58] Field of Search ........ 113/116 D, 116 Y, 116 BB; 29/159.01, 417; 428/579, 580, 577; 83/32, 50, 687, 620

[56] References Cited

U.S. PATENT DOCUMENTS

| | | | |
|---|---|---|---|
| 878,299 | 2/1908 | Livingstone | 428/580 |
| 1,415,507 | 5/1922 | Baltzley | 113/116 D |
| 1,469,757 | 10/1923 | Sibley | 83/50 |
| 2,083,229 | 6/1937 | Horn et al. | 29/159.01 |
| 2,307,335 | 1/1943 | Reddick | 29/159.03 |
| 2,836,018 | 5/1958 | Key | 29/417 |
| 3,261,083 | 7/1966 | Mayrath et al. | 29/159.01 |

FOREIGN PATENT DOCUMENTS 2336534 2/1975 Fed. Rep. of Germany .... 113/116 BB

Primary Examiner—Daniel C. Crane
Attorney, Agent, or Firm—Barnes, Kisselle, Raisch & Choate

[57] ABSTRACT

A wheel disc and method of manufacture wherein disc blanks are punched from a continuous length of strip material in an enchelonned nested pattern so as to minimize stock scrap and wastage. The disc blanks are substantially flat and have a peripheral edge defined by a series of concentric convex crowns separated from each other by concave recesses. The disc blanks are each formed to a final cross sectional configuration which optimizes the relationship of disc strength to weight. The disc is welded into a drop center wheel rim to provide a wheel assembly for pneumatic tubeless tires.

3 Claims, 21 Drawing Figures

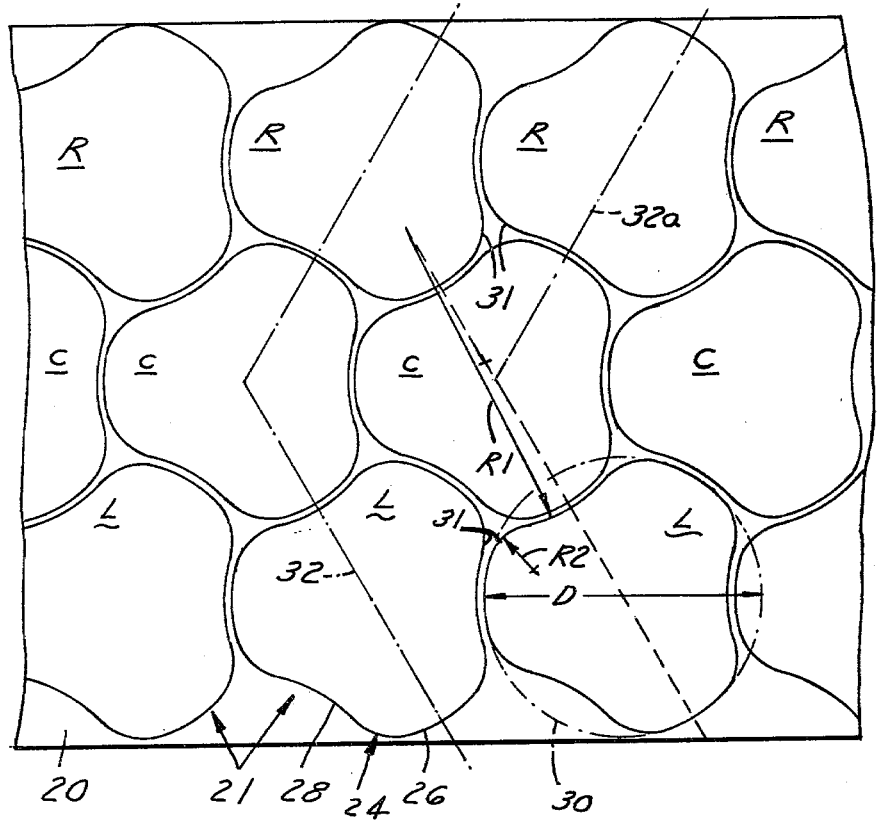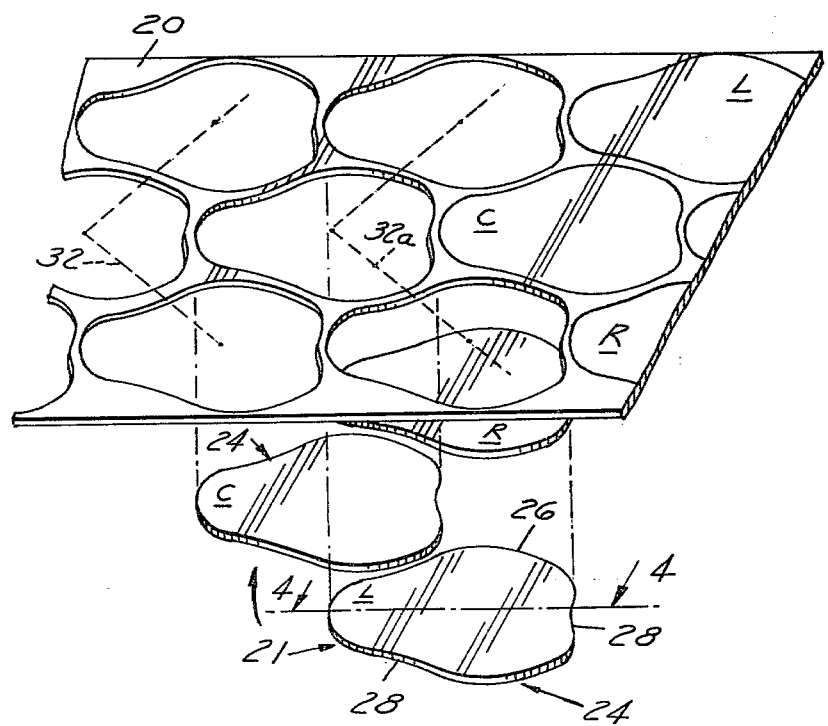

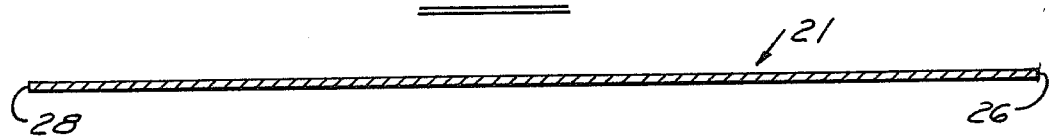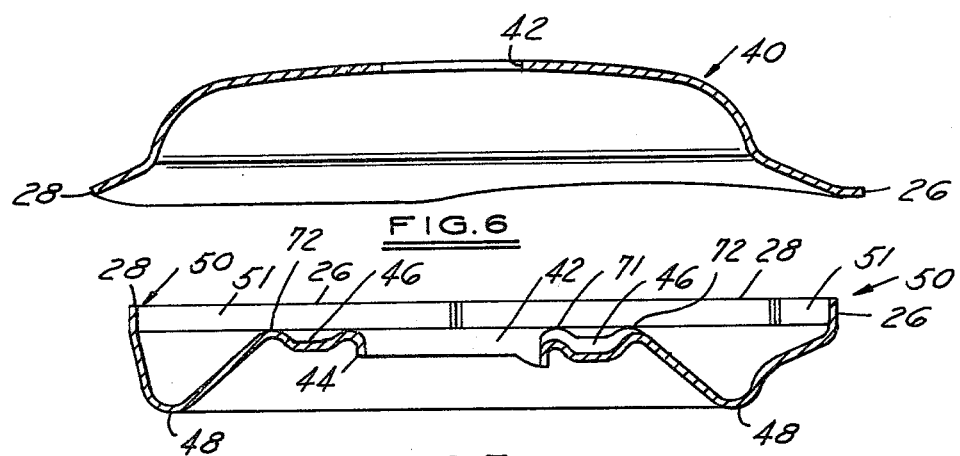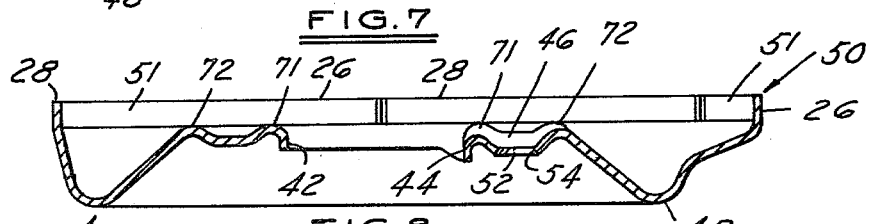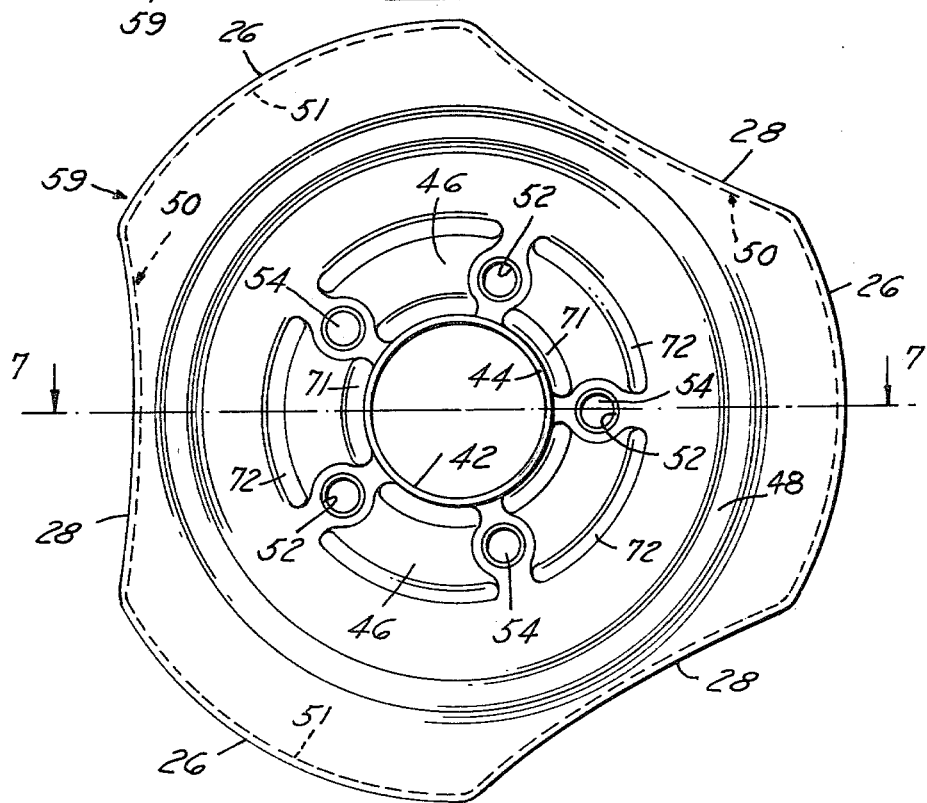

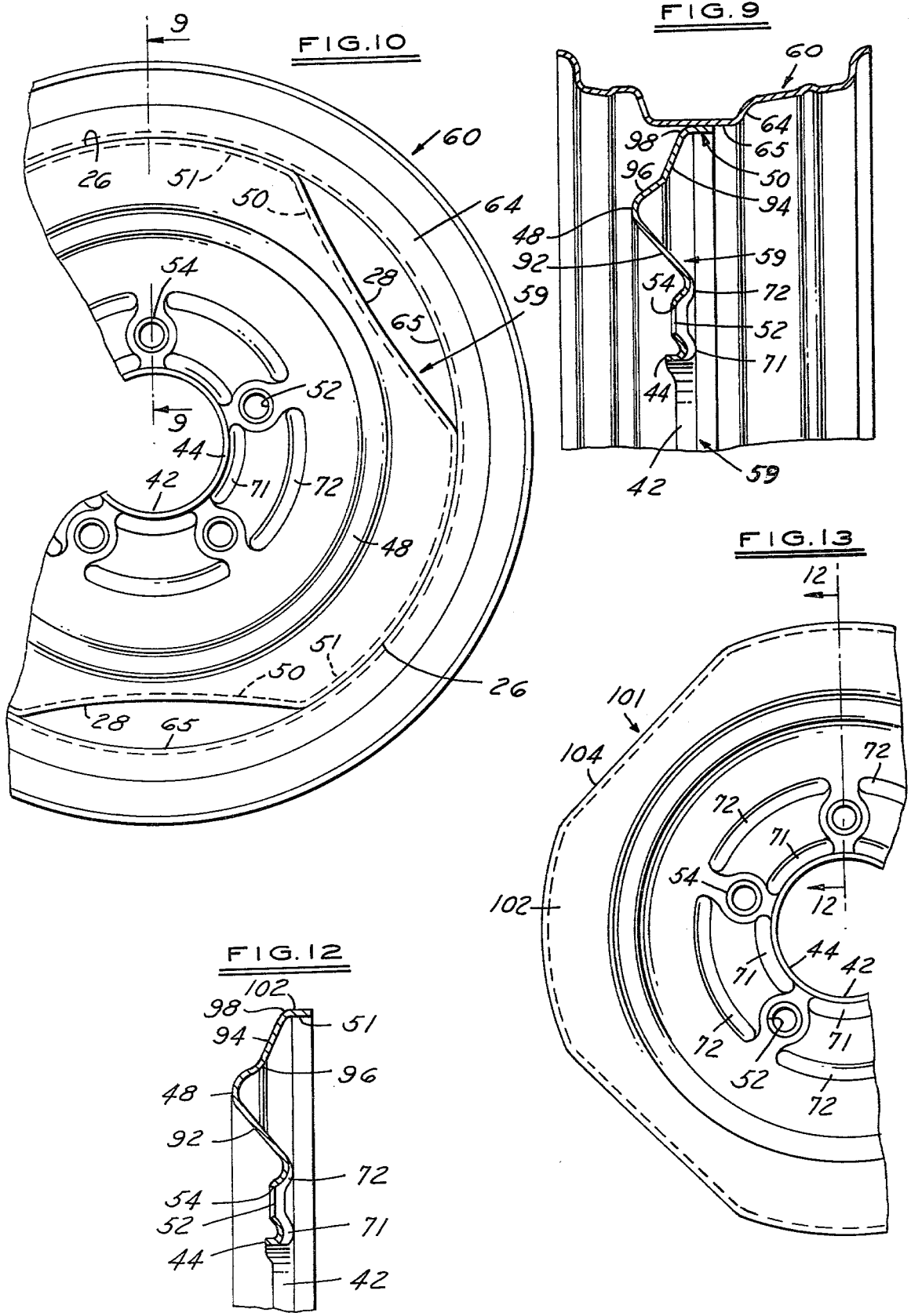

METHOD OF MANUFACTURING WHEEL DISCS

The present invention pertains to vehicle wheels, and more particularly to wheel discs and methods for manufacture thereof.

A general object of the present invention is to provide a wheel disc which is more economical to manufacture than, and yet retains the strength and durability of wheel discs of the prior art. In furtherance of the foregoing, a more specific object of the invention is to provide a vehicle wheel disc which possesses an enhanced strength/weight ratio, and thus utilizes less stock material than do prior art wheel discs of comparable strength. A further object of the invention is to provide a wheel disc which achieves a more uniform stress distribution throughout the disc material.

Another object of the present invention is to provide a method for manufacture of wheel discs which reduces scrap or wastage of stock material, and therefore is more economical than are comparable methods of the prior art. A further object of the invention is to provide a method for manufacture of wheel discs having an enchanced strength/weight ratio as previously described.

The invention, together with additional objects, features and advantages thereof, will be best understood from the following description, the appended claims and the accompanying drawings in which:

FIG. 2 is a fragmentary plan view drawn to scale of a continuous sheet of strip stock illustrating the disc blanking patterns thereon;

FIG. 3 is a fragmentary perspective view of the stock material illustrating the step of punching disc blanks from strip stock material in accordance with the invention;

FIGS. 4–7 are elevational views bisecting a wheel disc blank and illustrating successive stages of formation of the disc contour in accordance with the invention, FIG. 4 being taken along the line 4—4 in FIG. 3 and FIG. 7 being taken along the line 7—7 in FIG. 8;

FIG. 8 is a front elevational view of a completed disc in accordance with one presently preferred embodiment of the invention;

FIGS. 9 and 10 are respective fragmentary bisectional and front elevational views of a completed vehicle wheel in accordance with one presently preferred embodiment of the invention;

FIGS. 12 and 13 are respective fragmentary bisectional and front elevational views of a completed wheel disc in accordance with another preferred embodiment of the invention.

Figure 1:
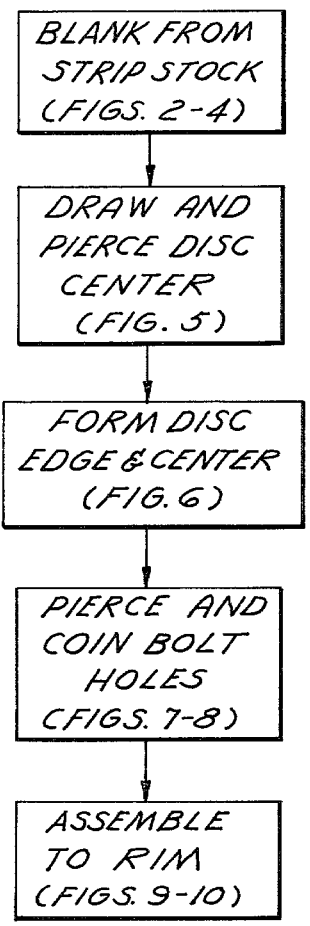
FIG. 1 is a block diagram of a method for manufacturing wheels and wheel discs in accordance with the invention.

Referring to FIGS. 1–4, and in accordance with a preferred mode for practicing one embodiment of the present invention, a plurality of disc blanks 21 are punched from a continuous length of strip stock material 20 in a fully automated punching operation and in a blanking pattern which minimizes stock scrap and wastage. Individual disc blanks 21 in accordance with one presently preferred embodiment of the invention are best illustrated in FIGS. 2 and 4 as each comprising a nominally flat section of sheet steel having an outline or perimeter 24 (FIG. 2) defined by a circular array of equally spaced crown or convex edge portions 26 separated from each other by the recessed or concave edge portions 28. The outer edges of convex edge portions 26 for each blank 21 lie substantially on a circle 30 (FIG. 2) having a diameter D centered on the disc blank. Concave edge portions 28 are essentially curvilinear secants to the circle 30 having a radius of curvature R1 centered in the next-adjacent blank 21. Concave portions 28 are blended into crowns 26 by the transitional edge portions 31 having a radius of curvature R2. Thus, the edge 24 of each blank 21 is essentially a symmetrical six-sided series of equally spaced alternating crowns 26 and recesses 28. In one embodiment of the invention for a fourteen inch wheel, diameter D is equal to 14.56 inches, radius R1 is equal to nineteen inches and radius R2 is equal to three inches. Radius R1 is centered 24.97 inches from the center of the associated blank 21 on a line which passes through the center of the next-adjacent blank. FIG. 2 is scaled to these exemplary dimensions.

Disc blanks 21 are punched from strip stock 20 in successive symmetrical echelonned or V-shaped patterns 32 of three blanks 21 each, as best illustrated in FIGS. 2 and 3, stock 20 being advanced step-wise between blanking of successive patterns and held stationary while blanks 21 are punched therefrom. Referring to FIG. 2, disc blanks 21 are laid out in each echelon 32 with a crown 26 of the center disc blank C directed forwardly with reference to the direction of stock travel indicated at 33. The other crown portions of the central disc blank C are nested within opposing side concave portions 28 of the left and right disc blanks L and R immediately to either side of the central blank C within the same echelon 32. The forwardly directed crown 26 of center blank C in the succeeding echelon 32a is nested within a rearwardly opening concave portion 28 of the center blank C in the preceding echelon 32, and the forward side concave edge portions 28 of the center blank C in echelon 32a receive the opposed rearward convex edge portions 26 in the side blanks L and R of the preceding echelon 32. The opposing edges of the respective disc blanks 21 (C, L and R) are separated from each other in the same and adjacent echelons by a relatively narrow margin of stock material to accommodate fracture or break-out resulting from the punching operation. Stock width is selected to be slightly greater than the width of the echelonned disc blank patterns 33 so as to provide a slight margin at the strip edges. It will be appreciated that the nested disc blank patterns illustrated in FIGS. 2 and 3, which is to say both the edge pattern 24 of the individual discs 21 per se and the echelonned nested arrangement thereof on the strip stock material 20, provides efficient utilization of stock material with little scrap or wastage.

The individual disc blanks are next formed in a drawing operation to the centrally crowned or cupped configuration illustrated at 40 in FIG. 5, and a central hole 42 is pierced in the disc blank simultaneously with the drawing operation. The crowned disc center and the disc margin or edge are then formed in a series of bending and stretching operations to the final desired disc cross sectional configuration (FIG. 6), such as by using conventional stamping press techniques. More specifically, an axially extending flange 44 is formed downwardly in FIG. 6 or outwardly (with reference to the orientation of the wheel assembly to a wheel hub 70 in FIG. 11) around the perimeter of center disc hole 42 to pilot the disc onto the wheel hub. A circular array of depressions or pockets 46 is simultaneously formed around center hole 42 concentrically therewith for later formation of the wheel mounting bolt holes. Coaxial segmented circular shoulders 71 and 72 separate pockets 46 from each other. The disc perimeter or edge is turned upwardly or inwardly so as to form a circumferentially continuous flange 50 around the disc edge, flange 50 undulating along the outer edges of both disc edge crowns 26 and recesses 28 (as best seen in FIG. 8). The flange segments 51 extending axially of each disc edge crown 26 are cocylindrical and coaxial with the disc axis at the center of hub hole 42. An outwardly or downwardly crowned hat portion 48 is formed intermediate the disc flange 50 and depressions 46. The contour of the intermediate disc portion, including crowned portion 48, will be discussed in greater detail hereinafter in connection with FIG. 11.

The partially formed disc shown in FIG. 6 is then further worked to the final configuration in FIGS. 7 and 8. In this next method step, disc formation is completed by piercing the bolt mounting holes 52 in the bases of respective depressions 46 concentrically with center hole 42, and then beveling the perimeter 54 of each bolt hole 53 in a coining operation both to remove break-out resulting from the piercing operation and to facilitate eventual centering of the disc and rim on a vehicle. The completed disc 59 (FIGS. 7 and 8) may then be assembled to drop center wheel rim 60 (FIGS. 9 and 10) for pneumatic tubeless tires by welding cocylindrical flange portions 51 to the inside surface 65 of rim drop well 64. The flanged edges of disc peripheral recesses 28 form inwardly bowed or concave secants or chords to the cylinder of revolution defined by the opposing inner surface 65, thereby defining three equally spaced chain slots or vent openings intermediate the convex disc portions so as to lend a three-spoked appearance to the wheel assembly.

Figure 11:
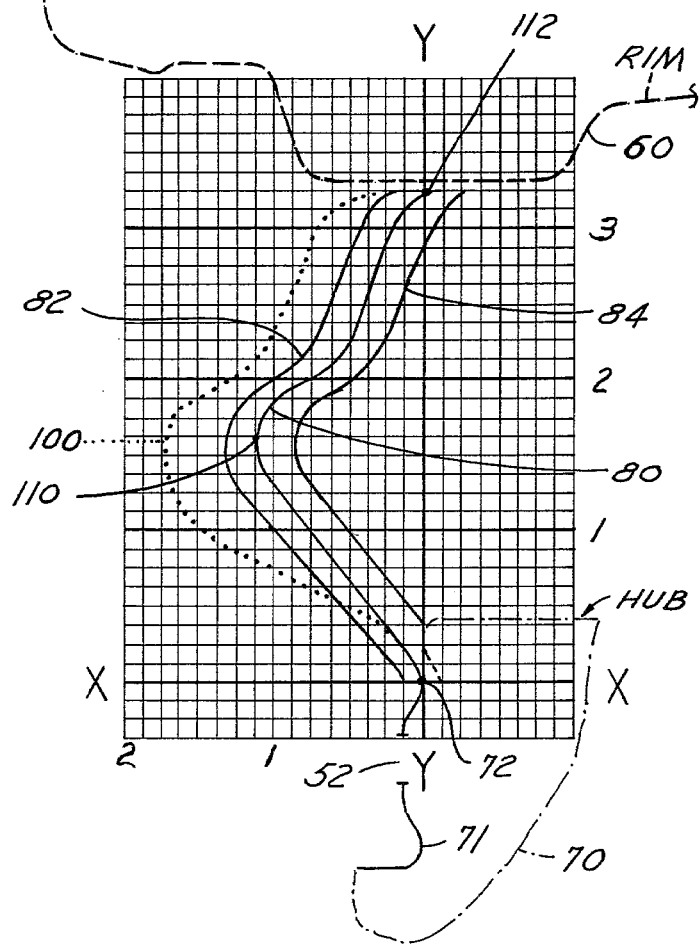
FIG. 11 is a graph drawn to scale and illustrating the optimized disc contour in accordance with one important aspect of the present invention.

FIG. 11 is a graphic illustration of another important aspect of the present invention by means of which the intermediate portion of the disc between the circle of mounting holes 52 and the rim-engaging flange portions 51 (shown in FIG. 7 but omitted from FIG. 11) is tailored or contoured so as to optimize the strength-to-weight characteristic of the disc. When a disc is mounted to a vehicle hub 70 or the like by means extending through bolt holes 52, the central portion of the disc is clamped snugly against the opposing hub surface such that the disc portion around the bolt holes absorbs or "sees" only clamping stresses. In the particular presently preferred disc configuration, the bolt holes 52 are offset from the opposing hub surface, and the disc is in essentially circular line contact with the hub surface along shoulders 71,72. The outer or flanged portion of the disc is welded or otherwise rigidly attached to the wheel rim 60. Thus, it is the intermediate portion of the disc between rim flange 50 and the point or line of contact between shoulder 72 and hub 70 which absorbs or "sees" dynamic loading stresses, and is the portion to which FIG. 11 is directed.

Specifically, FIG. 11 is drawn to scale and illustrates the contour of the cross sectional or thickness centerline of the disc intermediate portion between shoulder 72, which is taken as the origin in FIG. 11, and rim flange 50. In FIG. 11, the line 80 represents the preferred nominal centerline of the disc intermediate portion in the upright orientation of FIG. 9, while the lines 82,84 respectively illustrate the outer and inner tolerance limits of the disc contour centerline of the disc intermediate portion in accordance with a preferred embodiment of the invention. The lines 80,82 and 84 have been plotted to scale from the points listed in the following table:

TABLE I

| Y | (all measurements in mm) | | |
|---|---|---|---|
| | X-min (84) | x-nominal (80) | x-max (84) |
| 0.0000 | −3.175 | 0.0000 | 3.1750 |
| 3.1852 | −2.2667 | 0.9093 | 4.0843 |
| 6.3551 | 0.2845 | 3.4595 | 6.6345 |
| 9.5250 | −0.2489 | 6.1011 | 12.4511 |
| 12.7000 | 2.4689 | 8.8189 | 15.1688 |
| 15.8750 | 5.1054 | 11.4554 | 17.8054 |
| 19.0500 | 7.8029 | 14.1529 | 20.5029 |
| 22.2250 | 10.4191 | 16.7691 | 23.1191 |
| 25.4000 | 13.1420 | 19.4920 | 25.8420 |
| 28.5750 | 15.7683 | 22.1183 | 28.4683 |
| 31.7500 | 18.4455 | 24.7955 | 31.1455 |
| 34.9250 | 20.5283 | 26.8783 | 33.2283 |
| 38.1000* | 21.7424 | 28.0924* | 34.4424 |
| 41.2750 | 21.5900 | 27.9400 | 34.2900 |
| 43.1800 | 20.6908 | 27.0408 | 33.3908 |
| 47.6250 | 18.4455 | 24.7955 | 31.1455 |
| 50.8000 | 12.5019 | 18.8519 | 25.2019 |
| 53.9750 | 8.1432 | 14.4932 | 20.8432 |
| 57.1500 | 5.8115 | 12.1615 | 18.5115 |
| 60.3250 | 4.5466 | 10.8966 | 17.2466 |
| 63.5000 | 3.3020 | 9.6520 | 16.0020 |
| 66.6750 | 2.0269 | 8.3769 | 14.7269 |
| 69.8500 | 0.9601 | 7.3101 | 13.6601 |
| 73.0250 | −0.3454 | 6.0046 | 12.3546 |
| 76.2000 | −1.5392 | 4.8108 | 11.1608 |
| 79.3750 | −3.5154 | 2.8346 | 9.1846 |
| 80.6399* | −7.5946 | −1.2446* | 5.1054 |

The peak of hat portion 48 and at the junction with disc flange 50 are shown at 110,112 in FIG. 11 and are denoted with an asterisk (*) in Table I.

The closest prior art known to applicant to the presently preferred disc contour illustrated graphically in FIG. 11 and to scale in FIGS. 7 and 9 is illustrated at 100 in FIG. 11, and illustrates the centerline of a commercial wheel manufactured by applicant's assignee and appearing on one or more of the Chrysler F car models Dart, Demon, Swinger and Aspen during the period 1965 to 1976.

The disc intermediate portion, which has been hereinabove defined as that portion between hub-contacting shoulder 72 and rim flange 50, may best be verbally described in greater detail with reference to FIGS. 7 and 9. Starting from shoulder 72, the contour of the disc intermediate portion includes a first conical portion 92 extending axially and radially outwardly (of hub 70) having an angle with respect to the disc axis in the range of 45° to 55°. Conical portion 92 terminates in previously-described hat portion 48 which, in the preferred embodiment shown to scale in the drawings, has a radius of curvature in the range of 11.938 to 13.462 mm. This radius is centered at x=19.050 mm and y=39.624 mm. A second conical portion 94 extends inwardly (again with reference to mounting hub 70) at an angle in the range of 65° to 75°, and is coupled to hat portion 48 by the arcuate blending portion 96. Portion 96 has a radius of curvature in the range of 8.895 to 10.416 mm and is centered at x=24.638 mm, y=61.267 mm. Conical portion 94 is coupled to flange 50 by the disc flange radius 98 in the preferred range of 7.112 to 8.636 mm. The flange radius is centered at x=0.4=74.079 mm. It will be noted with particular reference to FIG. 11 and Table I that the upper edge of the intermediate disc portion adjoining flange 50 is preferably substantially coplanar with the circular line of contact between shoulder 72 and hub 70—i.e. at x=0.

Figure 14:
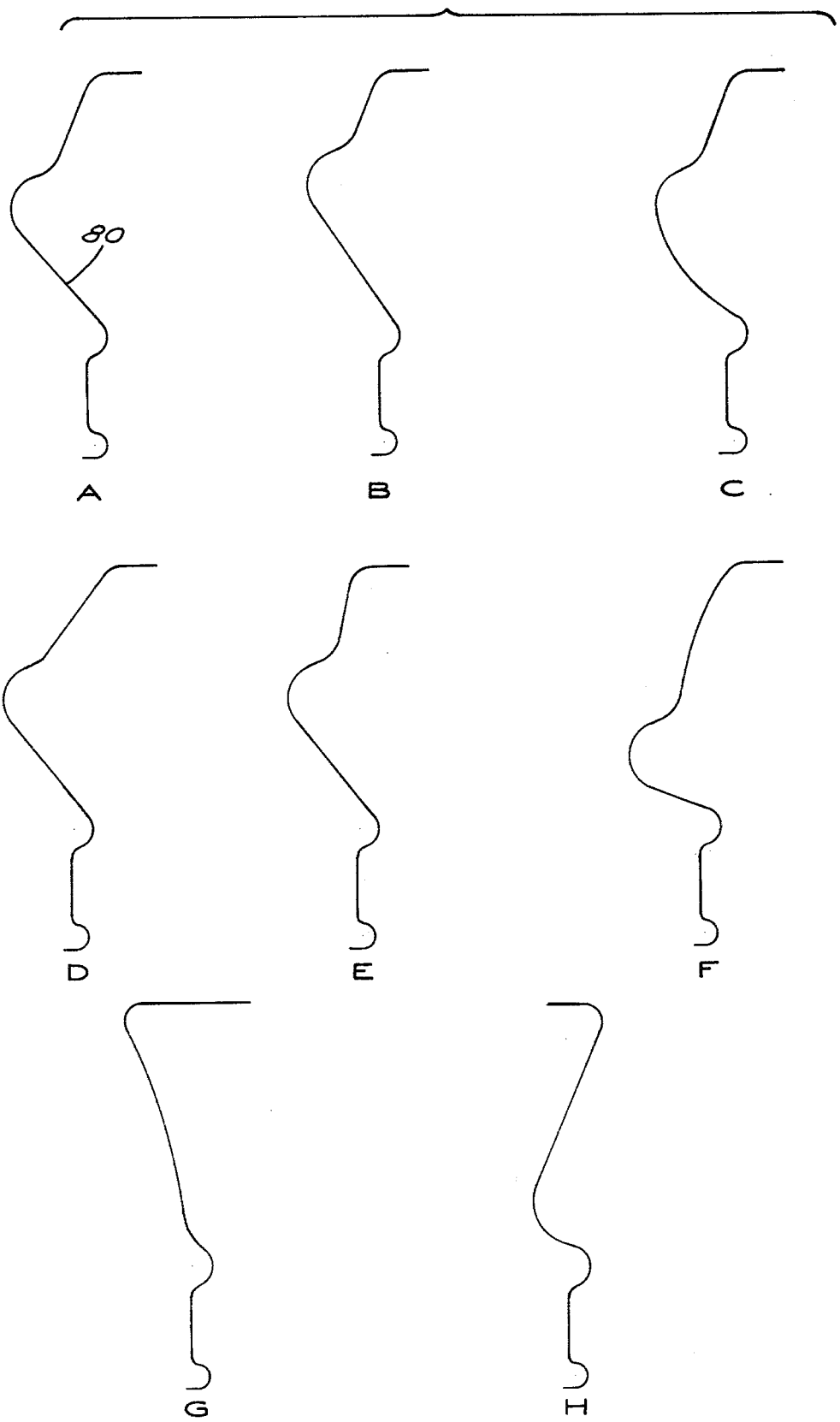
FIGS. 14A–14H illustrate various disc contours which have been analyzed in developing the invention, the contour of FIG. 14A being preferred.

Various disc thickness centerline contours were analyzed by finite stress analysis techniques on an appropriately programmed digital computer during development of the preferred embodiment hereinabove described. A number of such contours are illustrated in FIGS. 14A-14H, that at 14A being the same as that shown at 80 in FIG. 11 and herein preferred. Among the various parameters which distinguish the embodiments of FIGS. 14A-14H, the order of importance in yielding superior results as to FIG. 14A is believed to be as follows: the radius of curvature of hat portion 48, the center point of such radius, the angles of intermediate portions 92 and 94, and the location and curvature of flange radius 26.

FIGS. 12 and 13 illustrate a four-spoke disc 101 comprising a series of four flanged outer disc crowns 102 separated from each other by the substantially flat flanged secants 104. Upon applying finite stress analysis to the four-spoke disc, it was found somewhat surprisingly that the optimum contour for the four-spoke design is substantially identical to that for the three-spoke disc illustrated graphically in FIG. 11 and discussed previously. Accordingly, disc portions FIGS. 12 and 13 are identical by reference numerals identical to those previously discussed.

It will be appreciated that the invention has been described using directional adjectives such as "outer" and "inner" with reference to the contemplated axial orientation of the wheel as assembled to a vehicle. These and other directional adjectives will be understood to constitute words of description and not limitation when utilized in the appended claims. Similarly, a preferred embodiment of the invention for use on a fourteen inch wheel has been described in detail. However, the dimensions and coordinates, etc., may be readily scaled for other wheel sizes without departing from the scope of the invention in its broadest aspects.

The subject matter discussed hereinabove relative to optimized disc contour is the subject of the copending U.S. patent application of Michael Beam et al, Serial No. filed concurrently herewith and assigned to the assignee hereof. This subject matter is disclosed herein as being part of the presently preferred manner of practicing the present invention.

I claim:

1. A method of forming blanks for three-spoke wheel discs of the type having a periphery defined by three co-cylindrical first portions adapted for attachment to a wheel rim and three second portions alternating with said first portions and adapted to be spaced radially inwardly from the wheel rim, said method comprising the steps of advancing a continuous length of strip stock stepwise in the direction of its length and simultaneously punching at each incremental step three disc blanks having centers lying in a V-shaped pattern pointing lengthwise of said strip stock, each of said disc blanks having an outline defined by an alternating series of three concave edge portions and three convex edge portions with said convex edge portions lying substantially in a circle centered on the associated disc blank and said concave edge portions extending inwardly from said circle, each said concave edge portion having a radius of curvature centered on a line extending between the centers of adjacent blanks, and with convex edge portions of each disc blank outline being nested within concave edge portions of each adjacent disc blank outline both in the same V-shaped pattern and in the immediately preceding and subsequent V-shaped patterns such that wastage of stock material defined by interstices between disc blanks is minimized.

2. The method set forth in claim 1 comprising the additional step of bending each of said convex edge portions to form three cocylindrical flanges for attaching said disc to a wheel rim.

3. The method set forth in claim 1 wherein said echelon patterns and said disc blanks are substantially as shown in scale in FIG. 2 of the drawings.

* * * * *